F. TSCHUDY.
CLASSIFYING APPARATUS FOR USE IN THE DISTILLATION OF BENZOL HOMOLOGUES.
APPLICATION FILED JULY 5, 1917.
1,282,324.                                    Patented Oct. 22, 1918.
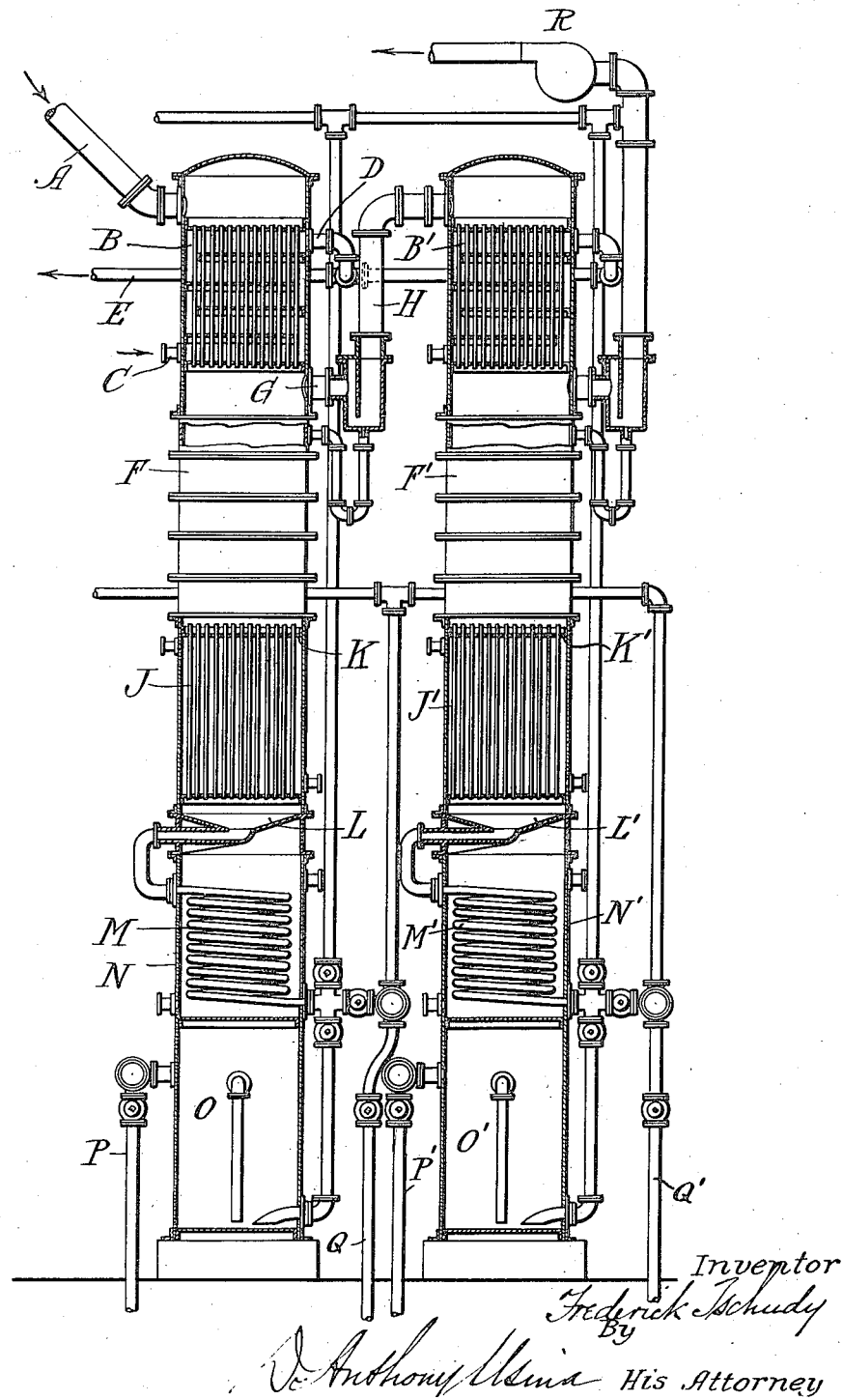

of# UNITED STATES PATENT OFFICE.

FREDERICK TSCHUDY, OF FAIRFIELD, ALABAMA.

CLASSIFYING APPARATUS FOR USE IN THE DISTILLATION OF BENZOL HOMOLOGUES.

1,282,324. Specification of Letters Patent. Patented Oct. 22, 1918.

Application filed July 5, 1917. Serial No. 178,613.

*To all whom it may concern:*

Be it known that I, FREDERICK TSCHUDY, a citizen of the United States, residing in Fairfield, Jefferson county, Alabama, have invented certain new and useful Improvements in Classifying Apparatus for Use in the Distillation of Benzol Homologues, of which the following is a specification.

In the distillation of products or homologues from benzol light oil the vapors driven off from the charge in the still at the required temperatures are, after being subjected to dephlegmation, conducted to a condenser in which they are liquefied into the desired product. To this condenser are brought vapors of a certain temperature yielding a product in accordance with the prevailing temperature. Higher boiling constituents contained in the vapors driven off in the stills must be thrown down in the dephlegmator connected to the still.

The purpose of this invention is to conduct vapors from the still to the condensers without throwing down certain of the homologues boiling at a temperature higher than the lowest boiling homologues desired, and to separate or classify such vapors at or near the point of condensation so that the still and the condensing apparatus can be worked continuously instead of in stages of certain temperatures yielding but one product. It is distinctly understood that while one classifier may be used for certain purposes of distillation, the principal purpose of the invention is to use two or more classifiers in series or parallel as the number of homologues to be extracted and the respective quantity thereof may demand. The apparatus of this invention is to be used in connection with other apparatus of any known or suitable type employed in the distillation of benzol products. In these other apparatus the vapors driven off at the still may be dephlegmated to condense out the highest boiling homologues or may be brought direct at their highest temperature to the apparatus of this invention.

It is advantageous in carrying out the invention to construct the apparatus so that the several component parts thereof are combined and built into a single structure forming a complete unit thereby saving floor space and also making it possible to readily connect the apparatus in series or in parallel with another similar apparatus or with other parts of the distilling plant.

The accompanying drawing illustrates in more or less diagrammatic vertical section, an apparatus embodying the invention and comprising two classifiers arranged in series.

Referring to this drawing, the vapors driven off at the still pass through a pipe A to a dephlegmator B, passing countercurrent to a cooling medium which is admitted through the pipe C and discharged through pipe D to a discharge pipe E common to both classifiers. In passing through the dephlegmator B the higher boiling homologues flow downward through a series of sections constituting a rectifying column F, while the vapors of the lower boiling homologues pass by way of pipes G and H to the dephlegmator B' of the next classifier. In this classifier the foregoing process is repeated on the lower boiling homologue from the first classifier; and the number of such classifiers in series may be extended as desired to condense out successive higher boiling homologues and to repeat the operation to the extent desired.

The products condensed in the dephlegmators B and B' and passing downward into the rectifying columns F and F' flow downward countercurrent to vapors arising from tubular heaters J and J' which are maintained at the required temperatures by any suitable heating medium such as steam, superheated hot water or hot products of the distilling process. The temperature is automatically maintained at the low point of the desired product. Thus, if a product is required boiling at between 90 degrees and 110 degrees C., the temperature of the heater is kept such as to drive off all products boiling at 89 degrees C. The tubes in the heaters project several inches above the upper tube sheet K or K' so that the descending condensate is distributed in fine streams along the sides of the heater tubes and brought into close contact with the heat.

These heaters, therefore, permit to pass a condensate only which is of a higher boiling point than the next lower boiling homologue, and the heater evaporates all the homologues which it is desired to pass to the next classifier, but which may have passed the dephlegmator (B or B' respectively) of the corresponding heater or which may not have been carried up by the vapor tension in the rectifying column. Thus the vapors driven off by the heater J rise through the column F, mix with the vapors coming direct from the dephlegmator B and flow with them to the next classifier. The heater, therefore, serves to eject material not properly classified by the dephlegmator above and serves further to maintain the required vapor tension for the product which is to be classified in the next classifier.

The classified condensate which passes through the heater J, is collected in an insulated bottom L and passes therefrom through a coil M in a cooler N; the same parts being duplicated at L', M' and N' in the next classifier.

From the coolers the condensate is conducted into water separators O, O', in which possible aqueous vapors (arising from the use of water seals) are separated and from which the product overflows through pipes P, P' to the receiving tanks.

Where a vacuum is used for the process of distillation and water seals are dispensed with, the product is not passed through the separators O, O', but is conducted from the coolers N, N' directly through pipes Q, Q' to the storage or receiving tanks.

From the last classifier the vapors, freed from the higher boiling homologues are sucked off at low pressure by the blower R and conducted to the gas main for finished surplus gas.

What I claim is—

1. An apparatus of the character described consisting of a single unit structure including in combination a dephlegmator, a rectifying column through which the condensate from the dephlegmator passes, and a heater through which the condensate from the rectifying column passes, said heater being of tubular construction, the tubes thereof projecting a short distance beyond the bottom of said rectifying column to permit the condensate to flow therethrough in thin films to expedite the evaporation of the condensate, and being adapted to pass only the homologue desired and to force upward through the rectifying column the lower boiling homologues to mix with those which are passed by the dephlegmator and to maintain the required vapor tension thereon, an insulated header below said heater arranged to receive the condensate passing through the tubes of the said heater and means connected with said header whereby the condensate collected thereby may be cooled.

2. An apparatus of the character described consisting of a single unit structure including in combination a dephlegmator, a rectifying column through which the condensate from the dephlegmator passes, and a heater through which the condensate from the rectifying column passes, said heater being of tubular construction, the tubes thereof projecting a short distance beyond the bottom of said rectifying column to permit the condensate to flow therethrough in thin films to expedite the evaporation of the condensate, and being adapted to pass only the homologue desired and to force upward through the rectifying column the lower boiling homologues to mix with those which are passed by the dephlegmator and to maintain the required vapor tension thereon, an insulated header below said heater arranged to receive the condensate passing through the tubes of the said heater, means connected with said header whereby the condensate collected thereby may be cooled, a water separator disposed below said cooling means and means for passing the product from said cooling means through said separator.

3. An apparatus of the character described including in combination a dephlegmator, a rectifying column through which the condensate from the dephlegmator passes and a heater through which the condensate from the rectifying column passes, said heater adapted to pass only the homologue desired and to force upward through the rectifying column the lower boiling homologues to mix with those which are passed by the dephlegmator and to maintain the required vapor tension thereon, and a cooler to which the condensate from said heater passes, a water separator and means for passing the product from the cooler either through said separator or directly to a receiving tank.

4. An apparatus of the character described comprising a cylindrical shell divided by a plurality of transverse diaphragms into a dephlegmator, a rectifier heater, a cooler and a water separator, said rectifier being arranged to receive the condensate from the dephlegmator and said heater comprising a multiplicity of tubes whereby the condensate is spread in a thin film over a vast area to expedite the evaporation thereof and said cooler being located below the heater and being connected with an insulated header arranged with means to convey the condensate passed by the tubes to said cooler, said water separator being located below the cooler and provided with means for passing the product from the cooler either through said separator or directly to a receiving tank.

5. An apparatus of the character described including in combination a dephlegmator, a rectifying column through which the condensate from the dephlegmator passes and a heater through which the condensate from the rectifying column passes, said heater adapted to pass only the homologue desired and to force upward through the rectifying column the lower boiling homologues to mix with those which are passed by the dephlegmator and to maintain the required vapor tension thereon, a cooler to which the condensate from said heater passes, a water separator and means for passing the product from the cooler either through said separator or directly to a receiving tank and a second similar apparatus into the dephlegmator of which pass the vapors from the first dephlegmator and rectifying column.

In witness whereof, I have hereunto signed my name.

FREDERICK TSCHUDY.